United States Patent
Blanc et al.

(10) Patent No.: US 9,232,214 B2
(45) Date of Patent: Jan. 5, 2016

(54) OPTICAL DEVICE FOR DETECTION OF OPTICAL DEFECTS FOR AN IMAGING SYSTEM

(71) Applicant: THALES, Neuilly sur Seine (FR)

(72) Inventors: Jean-Francois Blanc, Mandelieu (FR); Kamel Houairi, Cannes (FR); Stephane Garin, La Roquette sur Siagnes (FR); Marc Bernot, Cannes la Bocca (FR); Arnaud Liotard, Grasse (FR); Christophe Devilliers, Grasse (FR)

(73) Assignee: THALES, Courbevoie (FR)

( * ) Notice: Subject to any disclaimer, the term of this patent is extended or adjusted under 35 U.S.C. 154(b) by 120 days.

(21) Appl. No.: 14/151,678

(22) Filed: Jan. 9, 2014

(65) Prior Publication Data

US 2014/0198222 A1  Jul. 17, 2014

(30) Foreign Application Priority Data

Jan. 11, 2013 (FR) ..................................... 13 00047

(51) Int. Cl.
| | |
|---|---|
| *H04N 17/02* | (2006.01) |
| *H04N 17/00* | (2006.01) |
| *G01M 11/00* | (2006.01) |
| *G01M 11/02* | (2006.01) |
| *G02B 7/00* | (2006.01) |
| *G02B 27/62* | (2006.01) |

(52) U.S. Cl.
CPC ........... *H04N 17/002* (2013.01); *G01M 11/005* (2013.01); *G01M 11/0221* (2013.01); *G02B 7/003* (2013.01); *G02B 27/62* (2013.01)

(58) Field of Classification Search
CPC ........ G01B 11/26; G01B 11/14; G01B 11/22; G02B 23/00; G02B 7/003
See application file for complete search history.

(56) References Cited

U.S. PATENT DOCUMENTS

| | | | | |
|---|---|---|---|---|
| 3,518,005 | A * | 6/1970 | Weber | 356/138 |
| 3,942,894 | A | 3/1976 | Maier | |
| 4,155,096 | A * | 5/1979 | Thomas et al. | 348/169 |
| 4,385,834 | A * | 5/1983 | Maxwell, Jr. | 356/153 |
| 4,772,122 | A * | 9/1988 | Kasner | 356/139.05 |
| 5,142,400 | A * | 8/1992 | Solinsky | 398/129 |
| 5,880,834 | A * | 3/1999 | Chrisp | 356/328 |
| 6,100,974 | A * | 8/2000 | Reininger | 356/300 |
| 6,522,440 | B1 * | 2/2003 | Poon et al. | 398/131 |
| 7,184,136 | B2 * | 2/2007 | McHugh | 356/152.3 |
| 8,588,617 | B2 * | 11/2013 | Vaillon et al. | 398/122 |
| 2006/0098276 | A1 | 5/2006 | Kim et al. | |
| 2010/0238440 | A1 * | 9/2010 | Oskotsky et al. | 356/328 |

* cited by examiner

*Primary Examiner* — Victor Kostak
(74) *Attorney, Agent, or Firm* — Baker & Hostetler LLP (57) ABSTRACT

An optical monitoring device for an optical imaging system having a focal plane, an optical axis and an entry pupil, forming an image of a scene substantially at infinity on an image detector disposed substantially in the focal plane, comprises: a virtually point-like emission source at the periphery of the detector and substantially in the focal plane; a reflecting element with a plane surface upstream of the imaging system relative to the direction of light rays coming from the scene, and according to a position and inclination where a monitoring image of the source produced by the optical system and reflected by the reflecting element is substantially in the focal plane on a detection element connected to a monitoring image analyzer allowing potential optical defects to be identified; the reflecting element having an annular shape allowing passage of light rays coming from the scene and passing through the entry pupil.

16 Claims, 9 Drawing Sheets

OPTICAL DEVICE FOR DETECTION OF OPTICAL DEFECTS FOR AN IMAGING SYSTEM

CROSS-REFERENCE TO RELATED APPLICATION

This application claims priority to foreign French patent application No. FR 1300047, filed on Jan. 11, 2013, the disclosure of which is incorporated by reference in its entirety.

FIELD OF THE INVENTION

The invention relates to optical imaging systems and, in particular, high-resolution optical imaging systems. More precisely, the invention relates to an optical monitoring device for these optical imaging systems.

BACKGROUND

In order to operate in a satisfactory manner, an optical imaging system must exhibit good optical qualities, for example as regards the wave surface quality and the stability of the boresight.

When an imaging system exhibits a good wave surface quality, a point in the scene forms, in the image plane, an image dot exhibiting a light intensity distribution with dimensions essentially limited by the intrinsic resolution of the imaging system (diffraction limit). Any defect or incorrect positioning of the optical surfaces which compose the imaging system leads to a wave surface defect which results in an increase in the dimensions of the image dot and a decrease in the resolution of the system.

Generally speaking, a initially correctly adjusted system may exhibit a shift in the quality of its wave surface during the course of its operation.

For imaging systems placed onboard satellites for observing the Earth, such as instruments like high-resolution telescopes, monitoring of the variations in the wave surface is necessary in order to guarantee the quality of the recorded images.

One method for measuring the wave surface is to frequently acquire calibration images in order to follow the variation of the wave surface.

These calibration images may be obtained for example by taking specific photographs of specific external scenes: dedicated ground sites, stars.

Another known solution is to equip the instrument with an auto-calibration system comprising a mobile header mirror which, for the calibration, is oriented toward an internal target.

These solutions have the drawback of requiring a specific programming of the satellite, which may be at a high rate, for example every 20 min, each measurement requiring an interruption of the nominal programming operations of the satellite and potentially a displacement of mobile components.

Thus, the acquisition of calibration images leads to severe operational constraints.

Furthermore, in order to operate in a satisfactory manner, an optical imaging system must exhibit a good boresight stability. This stability is to be considered over the integration time scale in order to avoid the "blurring of the images" during the integration time and over the longer term in order to precisely reproduce the localization of the observed scenes.

These instabilities of the boresight are all the greater the smaller the IFOV (acronym for Instantaneous Field of View).

For onboard instruments, the greatest instabilities are vibrational in origin; they determine the mico-vibrational stability performance of the platform. Other instabilities are thermo-elastic in origin; they determine the thermo-elastic stability performance of the imaging system.

The aim of the present invention is to overcome the aforementioned drawbacks.

SUMMARY OF THE INVENTION

According to one aspect of the invention, an optical monitoring device for an optical imaging system is provided that has a focal plane (Pf), an optical axis (z) and an entry pupil, the system forming an image of a scene substantially at infinity on at least one image detector disposed substantially in the focal plane (Pf), the device comprising:
  at least one virtually point-like emission source disposed on the periphery of the detector and substantially in the focal plane,
  a reflecting element with a plane surface,
  the element being disposed upstream of the imaging system when considering the direction of propagation of the light rays coming from the scene, and according to a position and an inclination such that a monitoring image of the source produced by the optical system and reflected by the element is disposed substantially in the focal plane on a detection element connected to means for analysing the monitoring image allowing potential optical defects to be identified,
  the element (10) having an annular shape so as to allow the passage of light rays coming from the scene and passing through the entry pupil.

According to a preferred embodiment, the detection element of the optical monitoring device comprises a sensor disposed on the periphery of the image detector.

According to another embodiment, the detection element comprises an image detector.

Advantageously, the optical system comprises a telescope comprising at least a first aspherical collector mirror and a second mirror.

According to a preferred embodiment, the optical system comprises a telescope of the "TMA" (for Three Mirror Anastigmat) type.

According to one variant, the element is disposed around the second mirror.

According to another variant, the element is disposed at a distance close to the first mirror so as to minimize the effect of the decrease in useful diameter of the said entry pupil.

According to one embodiment, the source of the device comprises a first optical fibre disposed in a first plane perpendicular to the optical axis and a second optical fibre disposed in a second plane parallel to the first plane and offset with respect to this first plane, the first and second plane being disposed in the neighbourhood of the focal plane, the two defocussed monitoring images allowing a sign of the optical aberration of the imaging system to be determined.

Advantageously, the sensor is a phase-diversity sensor.

Advantageously, the sensor performs a first measurement for calibration of the monitoring image when the imaging system exhibits a given optical quality and at least a second measurement of the monitoring image carried out after a period of operation of the imaging system, the analysis means being designed to identify an optical defect by comparison between the first and second measurement of the monitoring image.

Advantageously, the device is designed to identify a defocussing of the imaging system.

Advantageously, the device is designed to identify a misalignment of a boresight of the imaging system.

According to another aspect of the invention, an optical imaging system is also provided comprising an optical monitoring device such as previously described.

According to another aspect of the invention, an active optical imaging system is also provided comprising an optical monitoring device such as previously described.

Advantageously, the imaging system is active and furthermore comprises control means designed to control an actuator capable of effecting a modification of the optical imaging system in such a manner as to correct at least partially the defect.

Advantageously, the defect comprises a defocussing and the actuator is designed to control a displacement of an optical element in such a manner as to correct the defocussing.

Advantageously, the defect comprises a misalignment of a boresight and furthermore comprises control means designed to control an actuator of the mirror type mobile in rotation in such a manner as to angularly modify the boresight in order to correct the misalignment.

BRIEF DESCRIPTION OF THE DRAWINGS

Other features, aims and advantages of the present invention will become apparent upon reading the detailed description that follows and with regard to the appended drawings presented by way of non-limiting examples and in which.

DETAILED DESCRIPTION

Before describing the invention, the notion of auto-collimation is firstly recalled.

Figure 1:
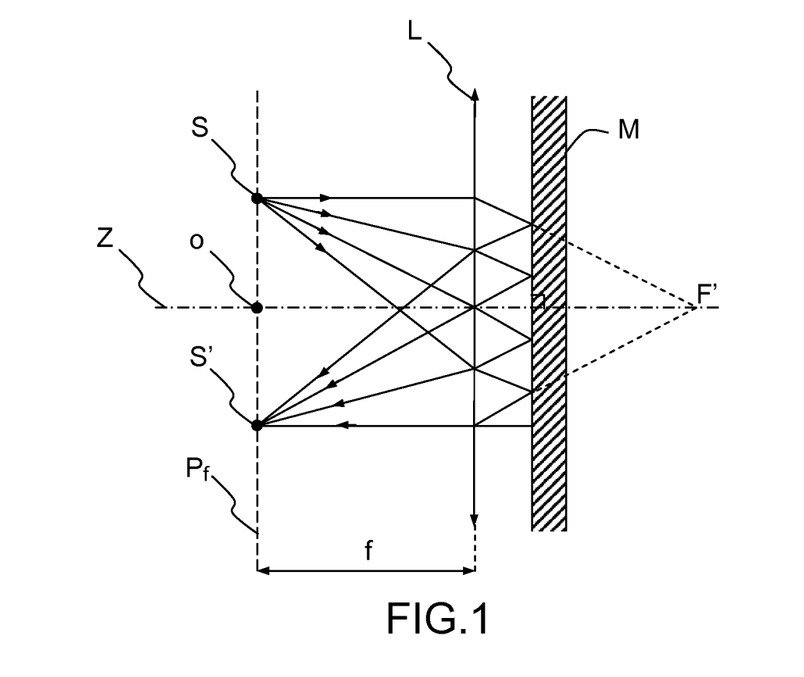
FIG. 1 illustrates schematically the principle of the auto-collimation.

FIG. 1 describes a mirror M in auto-collimation mode with respect to a converging optical system L with focal plane Pf and of focal length f. In this configuration, the image of an emissive point S disposed in the focal plane Pf formed by the optical system L and reflected by the mirror M is disposed at S', also in the focal plane and symmetrically to the point O, which is the point at which the optical axis cuts the focal plane.

Figure 2:
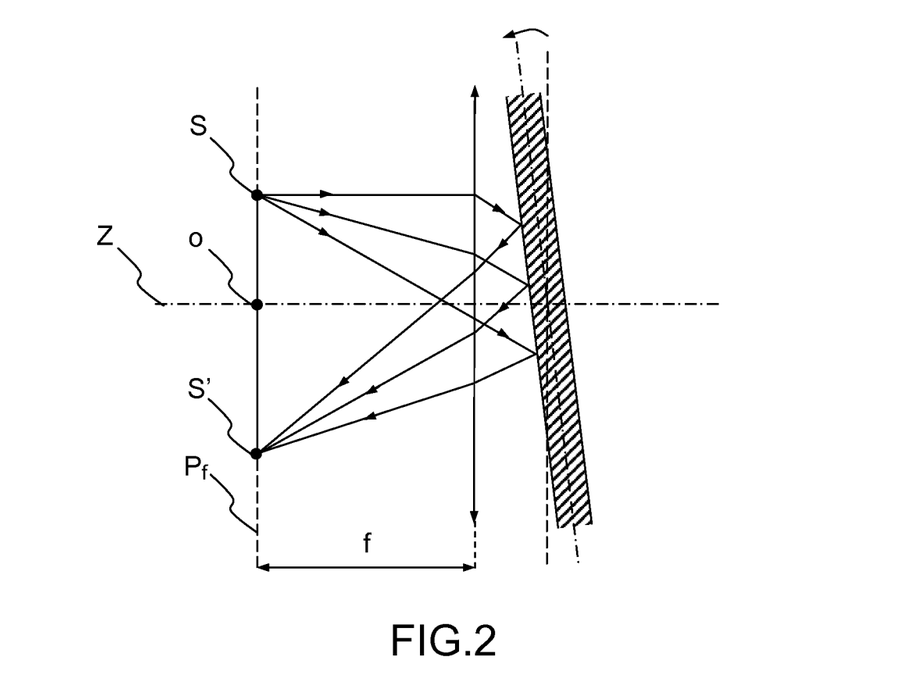
FIG. 2 illustrates schematically a optical configuration where the plane mirror is inclined with the respect to the optical axis.

FIG. 2 illustrates the case in which the mirror M is inclined with the respect to the auto-collimation position. The image S' of S is still in the focal plane but at a distance from O that is a function of the inclination of the mirror M.

Figure 3:
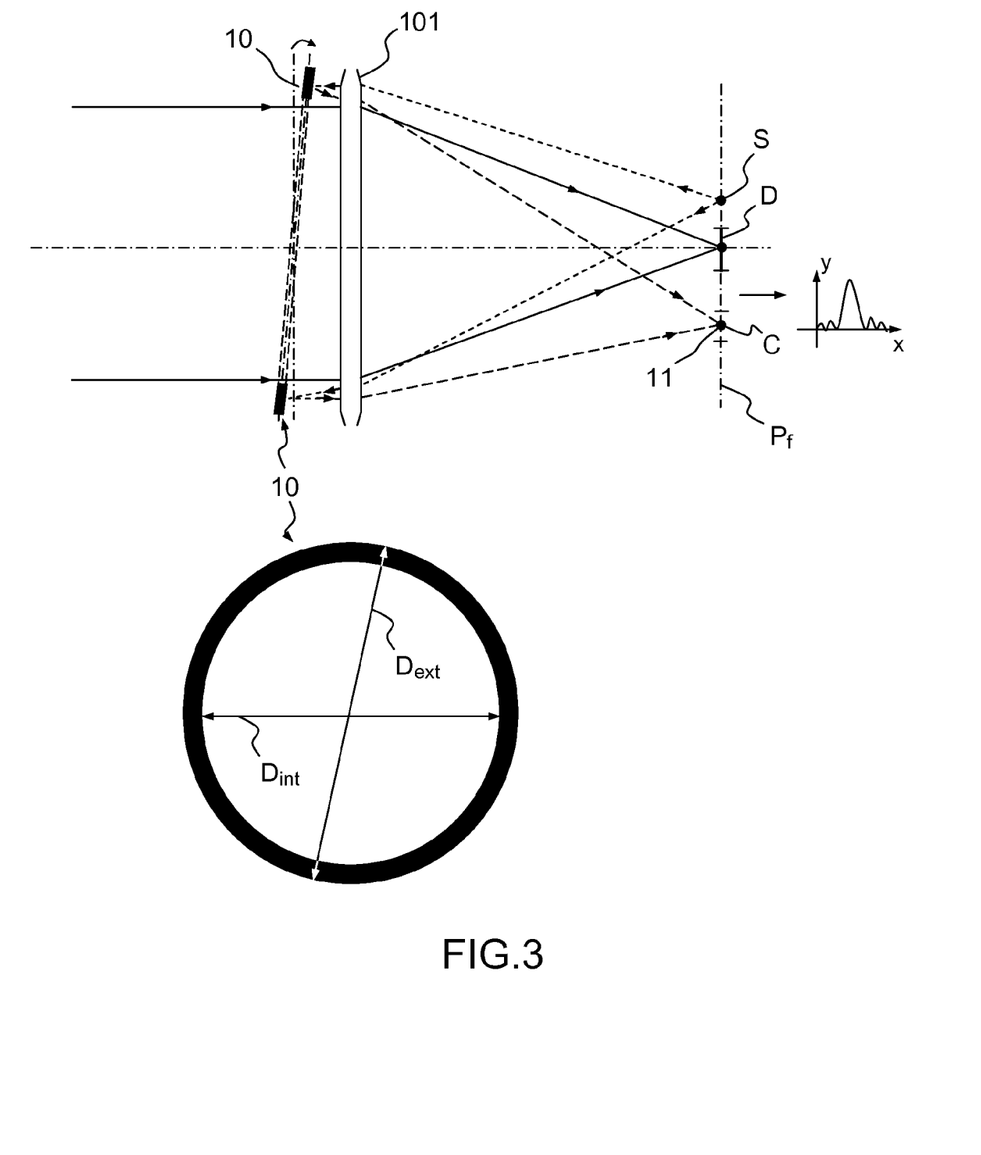
FIG. 3 illustrates schematically a device according to the invention.

FIG. 3 illustrates schematically a device 1 according to the invention. The device 1 performs an optical monitoring of an imaging system 101. Conventionally, the imaging system 101 has an optical axis z and one entry pupil.

The imaging system 101 is designed to form an image of a scene substantially at infinity in its focal plane Pf, according to a mode of operation known as "infinite focus" mode.

At least one image detector D is disposed in the focal plane Pf in order to detect the image of the scene being observed. An image detector D is for example a linear array or a matrix of pixels. Preferably, the imaging system is a very high resolution system.

In operation, the image detector D receives light rays coming from all the points of the scene.

The optical monitoring device according to the invention comprises a virtually point-like light-emitting source S disposed in the focal plane Pf and on the periphery of the image detector D.

The source S is sufficiently near to the detector D for a part of the light rays emitted to pass through the optical imaging system in the opposite direction to the light rays coming from the scene.

The surface monitoring device according to the invention also comprises a reflecting element 10 having a plane surface. The plane surface is of average optical quality, typically $\lambda/20$ ($\lambda$ wavelength of the light wave used).

The element 10 is disposed upstream of the imaging system 101 considering the direction of propagation of the light rays coming from the scene. Thus, the rays coming from the source S disposed in the focal plane and having passed through the system 101 form a plane wave which is reflected by the element 10.

The element 10 is disposed according to a position and an inclination with the respect to the optical axis z such that a monitoring image 11 of the source S produced by the optical system 101 and reflected by the element 10 is disposed in the focal plane Pf on a detection element C connected to means for analyzing the monitoring image 11. Typically, the inclination is very small and depends on the optical combination of the imaging system and also on its focal length.

Thus, the reflecting element 10 forms, in combination with the imaging system 101, an image of the source S on the detection element C, according to a monitoring image 11.

An analysis of the monitoring image 11 enables potential optical defects to be identified. This is because the rays which form the monitoring image 11 have passed through the optical system 101 twice and the monitoring image exhibits defects similar to those of the image by the optical system 101 of a point of the scene at infinity on the image detector D. The optical wave monitoring is carried out with the aid of the monitoring image 11, "witness" of the quality of the system.

Several positions of the element 10 are possible, as described hereinbelow.

In order not to interfere with the operation of the optical system 101, the element 10 has an annular shape such that it allows the passage of light rays coming from the scene and passing through the entry pupil of the optical system 101. In other words, the element 10 has an annular shape such that it does not completely obscure, and preferably it obscures to a minimum, the optical path of the rays coming from the scene and penetrating into the entry pupil so as to form the image on the image detector D.

The annular shape consists of a small diameter or internal diameter Dint and a large diameter or external diameter Dext.

One advantage of the system is that the monitoring operates without the addition and displacement of a mobile component such as a mirror or a shutter, and without having to make use of a specific disalignment programme for an imaging system onboard a satellite, the monitoring being carried out without modifying the conditions of operation of the imaging system. The device according to the invention is autonomous.

According to one variant, the detection element C is disposed on the periphery of the image detector D.

One advantage of the device according to this variant consists of the fact that the optical quality of the optical system 101 is monitored without interfering with the operation of the system, the source S, the detection element C and the reflecting element 10 being configured for generating a monitoring image while obscuring to a minimum, preferably not at all, the optical path followed by the light rays coming from the scene. This variant does not require any specific programming of the system in order to interrupt its operation. The measurement can thus be carried out according to a very long acquisition time, and hence with a very low signal/noise ratio, which allows a high measurement precision and a wide choice of sensor C.

Figure 4:
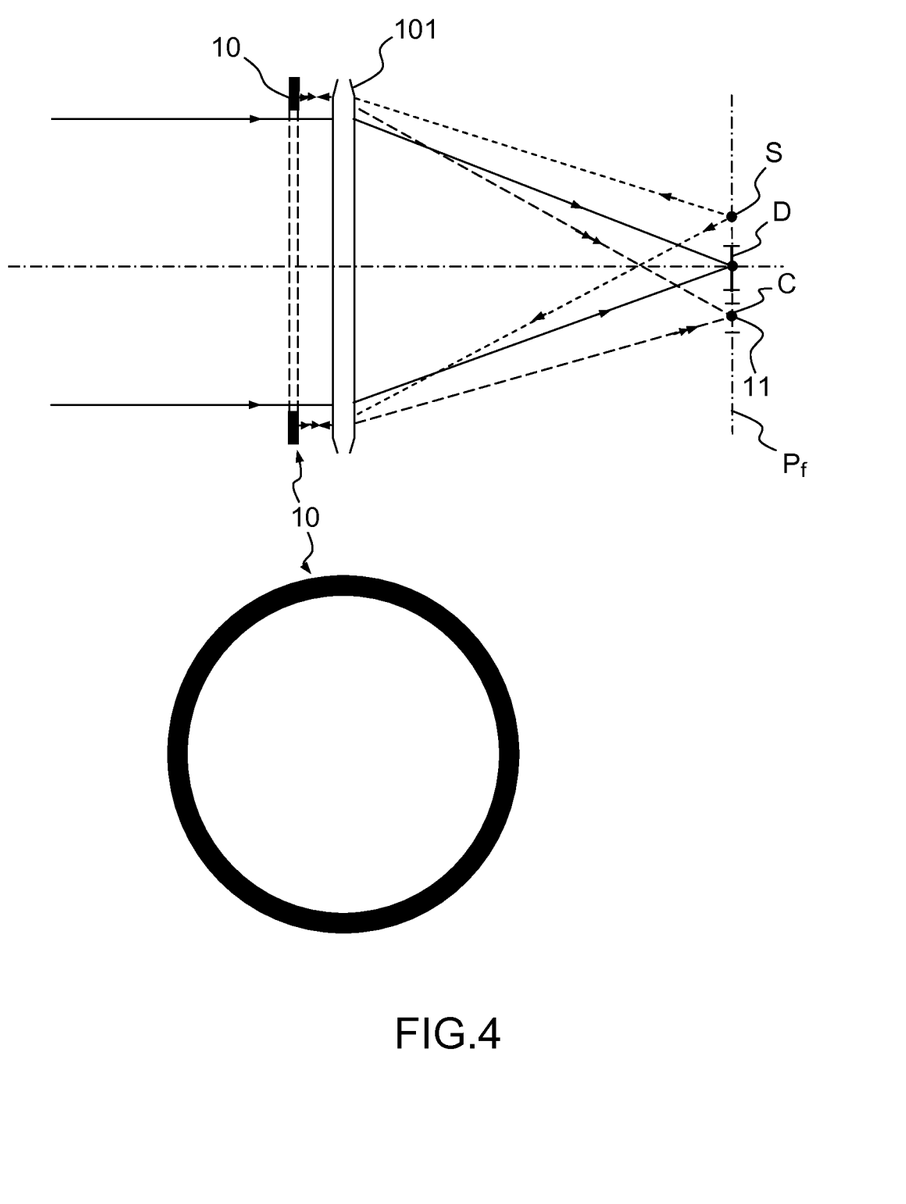
FIG. 4 illustrates schematically a particular case of the device according to the invention in which the reflecting element is in auto-collimation mode.

One particular case illustrated in FIG. 4 corresponds to the annular reflecting element 10 disposed in auto-collimation mode. The detection element C is then positioned symmetrically at S with the respect to the optical axis z. One advantage consists of a simplified adjustment of the device 1 integrated into the imaging system 101.

Figure 5:
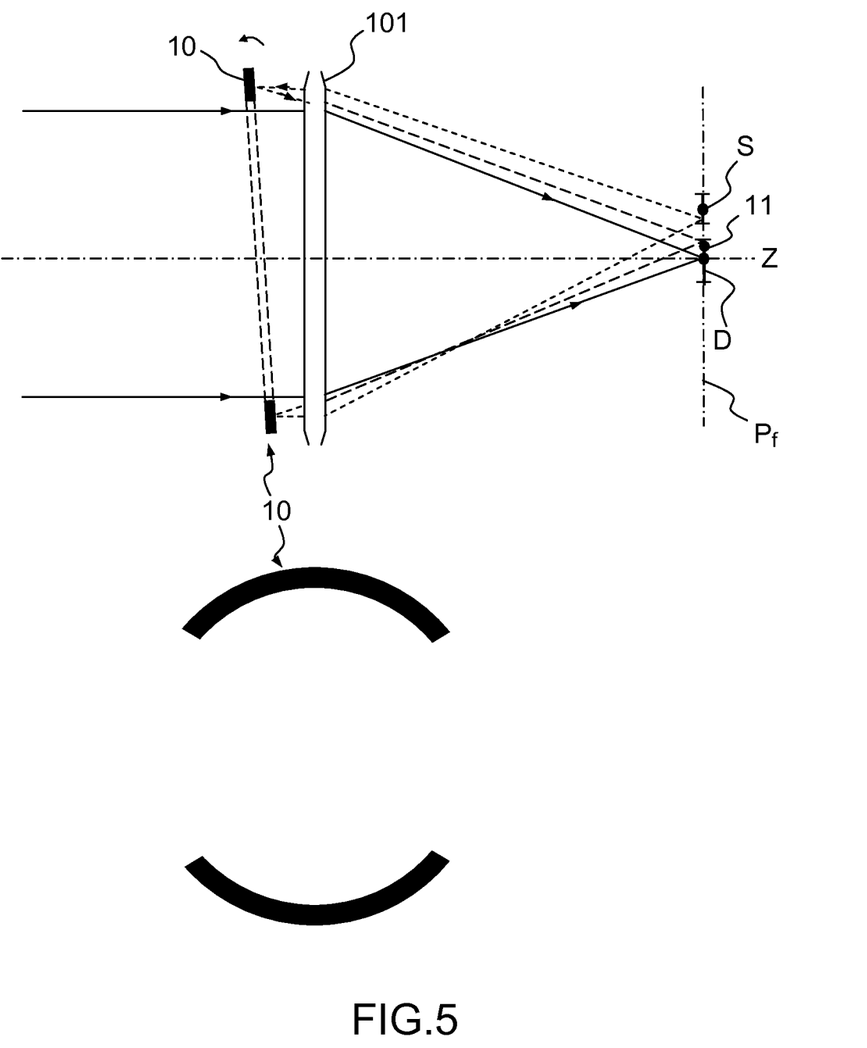
FIG. 5 illustrates a device according to the invention according to one variant embodiment of the invention.

According to another variant illustrated in FIG. 5, the detection element is formed by an image detector D. The advantage resides in the fact that there is no additional element disposed in the focal plane. The monitoring may be carried out outside of image acquisition or during the image acquisition. In the first case, the source S is disabled during the acquisitions by the detector D. In the second case, the monitoring spot is added to the acquired image. This second case is particularly suited to an optical monitoring consisting of the identification of a misalignment of the boresight.

According to a preferred variant, the annular shape is continuous.

According to another variant, also illustrated in FIG. 5, the annular shape is composed of at least two parts being symmetrical with respect to the optical axis.

According to a preferred variant, the imaging system is a telescope comprising at least a first aspherical collector mirror M1 and a second mirror M2. According to a preferred variant, the telescope is of the Three Mirror Anastigmat type, using the acronym TMA, preferably a TMA telescope of the Korsch type. For these telescopes, the entry pupil is disposed on the first mirror M1.

According to another example, the telescope is of the Cassegrain type.

These telescopes are for example carried onboard satellites for observing the Earth.

Figure 6:
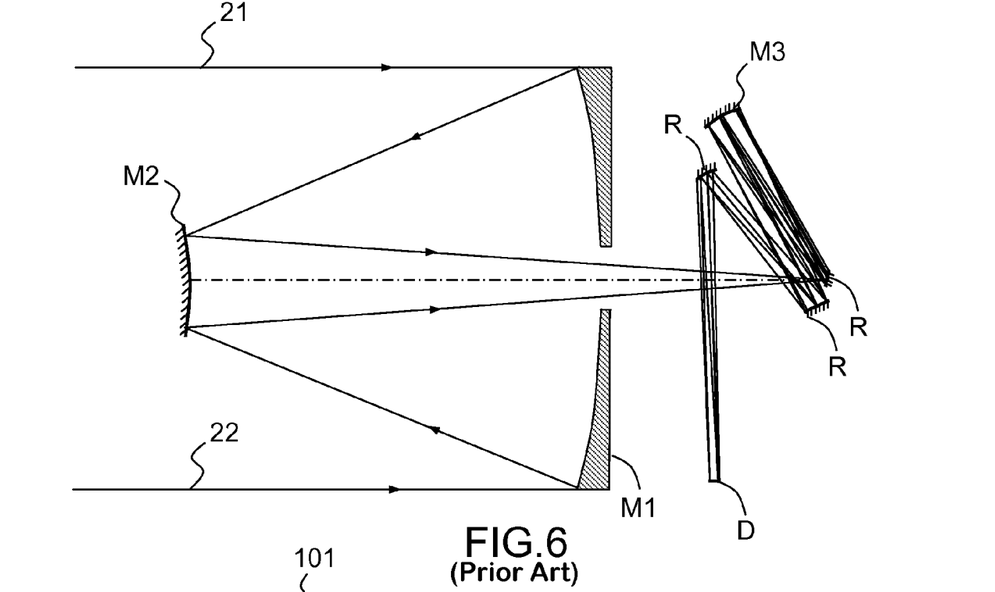
FIG. 6 illustrates schematically an onboard imaging system composed of a telescope of the Korsch type according to the prior art.

FIG. 6 illustrates schematically an onboard telescope of the Korsch type according to the prior art. Two light rays 21 and 22 coming from the observed scene situated at infinity are collected by the first aspherical mirror M1 which concentrates the rays onto a second mirror M2. For example, the dimension of the mirror M1 is from 1 to 4 m. The second mirror M2 focusses the rays onto an intermediate focal plane. In the rear part, an off-axis mirror M3 images the intermediate focal plane at the image focal plane in which the image detectors D are disposed. The focal length of the whole assembly is long, typically 15 to 70 m. Back-reflecting mirrors R fold back the rays.

The distance M1M2 is typically equal to 1 to 3 times the diameter of the first mirror M1.

By way of example, two embodiments of the device according to the invention will now be described for a telescope such as previously described.

Figure 7:
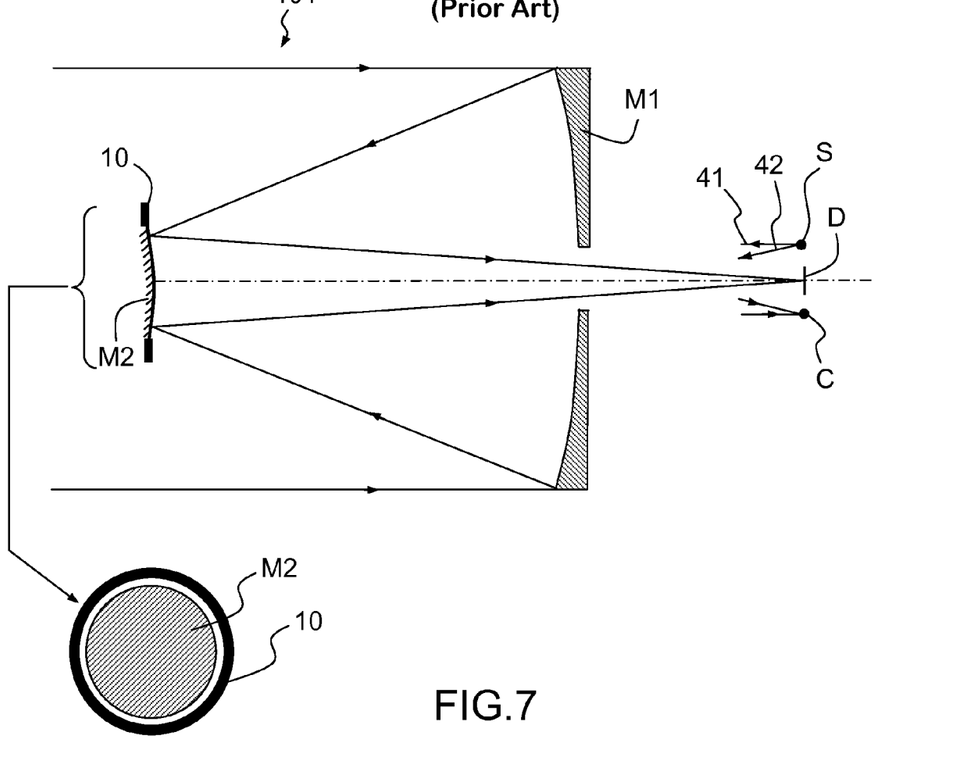
FIG. 7 illustrates a device according to the invention according to a first embodiment.

A first preferred embodiment, illustrated in FIG. 7, comprises an annular reflecting element 10 disposed around the second mirror M2 of diameter D(M2). Preferably, the annular section has a small diameter Dint substantially equal to the diameter of the mirror M2 D(M2) so as to minimize the overall size. As a variant, the element 10 is rigidly fixed to the mirror M2.

Preferably, the external diameter Dext is optimized so as to limit the central obscuring of the telescope while at the same time allowing the precision of the monitoring device sought to be attained. The smaller the width of the ring, the more resolved is the monitoring spot but the lower the intensity received by the detection element. One example of design dimensions for a mirror M2 of 300 mm is an annular section of 10 mm to 20 mm, or typically an external diameter Dext of the order respectively of Dint+5% to Dint+15%.

The optical path followed by the rays emitted by the source S is: S/M2/M1/element 10/M1/M2/S.

The inclination of the reflecting element is variable depending on the relative position of the source S and of the sensor C on either side of the optical axis z. For a telescope with a 1° field, it can vary from 0° to 1°.

One advantage of the first embodiment in which the element 10 is disposed around M2 consists of the fact that it is capable of forming an integral of the mirror M2. Another advantage resides in the fact that the element 10 is stable and is hardly influenced by the variations in the heat flow internal to the cavity formed by M1/M2.

Figure 8:
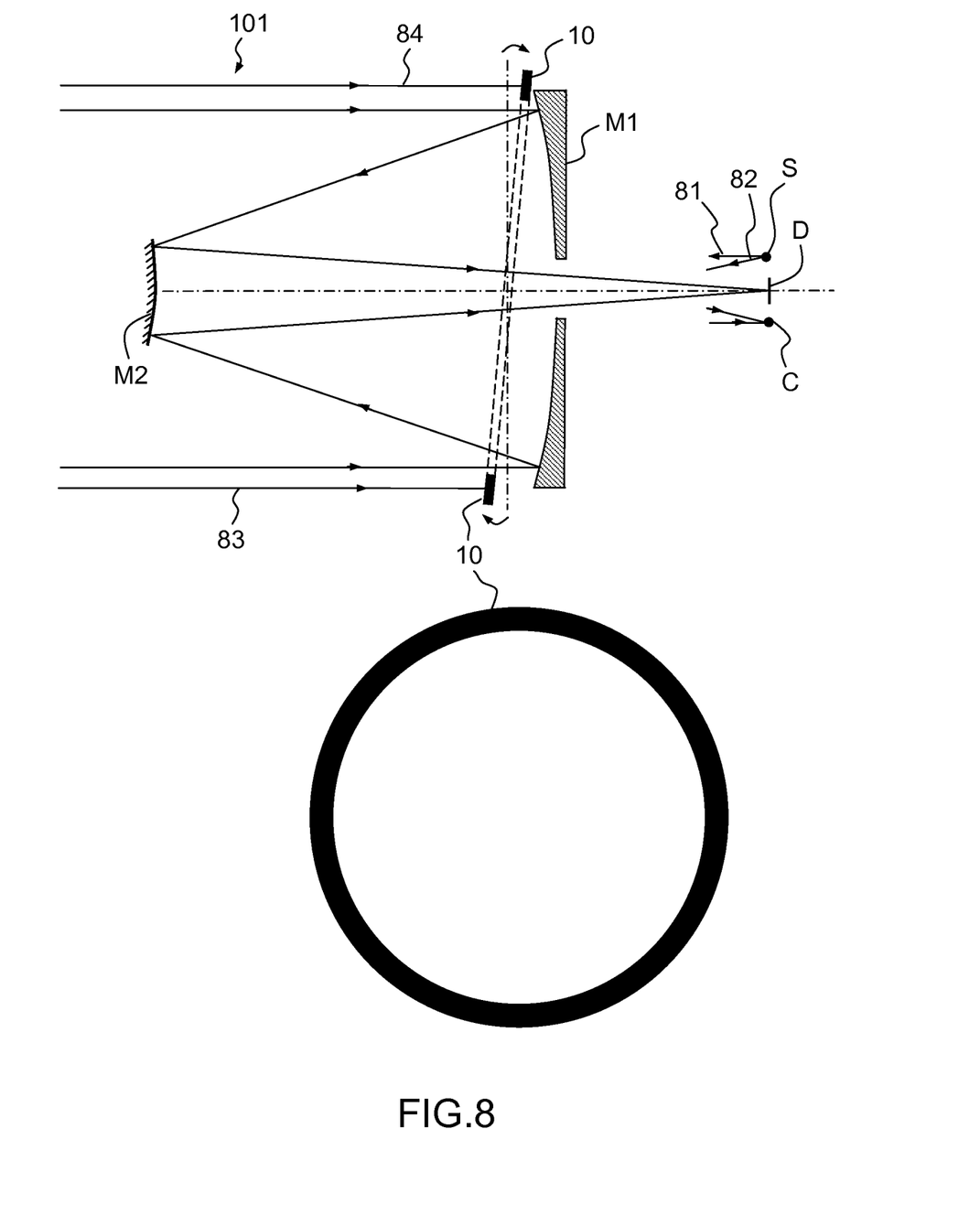
FIG. 8 illustrates a device according to the invention according to a second embodiment.

A second preferred embodiment illustrated in FIG. 8 comprises a reflecting element 10, disposed at a distance near to the element 10 of the first mirror M1 in order to minimize the effect of a decrease in the useful diameter of the entry pupil of the telescope.

The rays 81, 82 coming from the source S are reflected on M2, then on M1, then on the element 10 disposed upstream of M1. The optical path followed by the rays emitted by the source S is S/M2/M1/element 10/M1/M2/S.

According to this embodiment, the element 10 blocks the most peripheral rays 83, 84 incident on M1 and coming from the scene.

The rays coming from the observed scene follow the optical path:

Infinity/M1/M2/D.

The inclination of the annular element 10 depends on the relative position of the source S and of the sensor C on either side of the optical axis. For example, for a telescope with a 1° field, the inclination is less than or equal to 1°.

Preferably, in this embodiment the annular element 10 has a large diameter Dext substantially equal to the diameter of the mirror M1 D(M1). Preferably, the internal diameter Dint of the annular section is minimized in order to reduce the impact on the useful diameter of the telescope. Furthermore, the smaller the width of the ring, the more resolved is the monitoring spot, but the lower the intensity received by the detection element. One example of design dimensions for a mirror M1 of 3000 mm in diameter is a ring of 10 mm to 40 mm in thickness.

Figure 9:
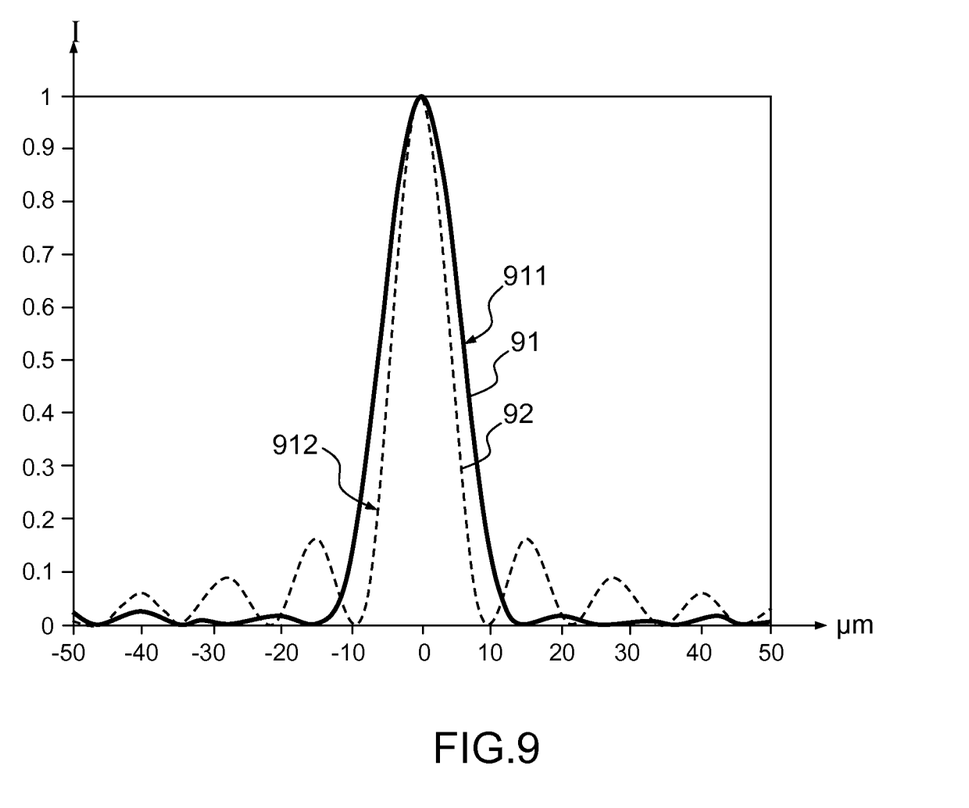
FIG. 9 illustrates the dependency between the image corresponding to a full pupil and the image corresponding to an annular pupil.

FIG. 9 illustrates the dependency between the image formed by an annular pupil and the image formed by a full pupil, for the same converging optics with a focal length f equal to 30 m. The curve 91 corresponds to the diffraction spot 911 obtained using a full pupil of diameter 1.5 m, and the curve 92 corresponds to the diffraction spot 912 corresponding to an annular pupil whose width of ring is equal to 2% of the diameter of the pupil. The width at half-height of the Airy spot 912 (ring) is close to the width at half-height of the Airy spot 911 (full pupil). This property of annular pupils is exploited in order to implement a sensitive optical monitoring of the deformation of the spot in order to follow and to correct the variation of the focussing. According to another example, this property constitutes a monitoring of the displacement of the spot in order to follow and to correct the variation of the boresight. As a variant, the two types of variation are monitored simultaneously.

Generally speaking, the thinner the annular-shaped reflecting element 10, the smaller the diameter of the Airy spot, a fact which allows a better sensitivity of the device. However, a thin ring reflects a lower intensity of light, and the sensitivity of the detector must be adapted as a consequence. Thus, the dimensions of the internal and external diameters Dint and Dext of the ring 10 result from a compromise between size constraints, desired resolution and sensitivity of the detector.

In order to obtain a monitoring image 11 with small dimensions, the source S must be point-like or virtually so. Advantageously, the source comprises at least one optical fibre, which is very small and allows a wide choice of emission wavelength. By way of example, the optical fibre has an emission dimension of 5 µm to 100 µm.

Advantageously, the system comprises two optical fibres close to one another sitting slightly out of focus, in other words positioned in the neighbourhood of, but not exactly in, the focal plane Pf, a first fibre being disposed in a first plane perpendicular to the optical axis and a second fibre in a second plane parallel to the first plane and offset with the respect to this first plane, allowing two out of focus monitoring images to be created, whose combined analysis allows a sign of the optical aberration of the imaging system to be determined.

According to one variant, the imaging system is in operation when the wave surface monitoring is operated with the device according to the invention. This variant requires a detection element C different from the image detector D and disposed on the periphery of the latter. The source must not increase the level of stray light in the optical imaging system 101. Advantageously, the imaging system 101 operates for the wavelengths in the visible light range and the source S emits in different wavelengths, to which the detector D is less sensitive, in order to minimize the stray light introduced into the system 101.

According to another variant, the observation made by the imaging system 101 is interrupted while the monitoring of the wave surface is operated by the device according to the invention. This variant is compatible with a detection element corresponding to one of the image detectors D.

The sensor C must be capable of detecting the light distribution of the monitoring image 11. The sensor C can be a matrix detector, a full-circle detector, a linear sensor, or a phase-diversity sensor.

The type of sensor depends on the type of defect that it is desired to monitor.

A monitoring method is based on a comparison between a first measurement of the monitoring image 11, referred to as calibration measurement, carried out when the imaging system 101 exhibits a given optical quality which is judged to be satisfactory, and at least a second measurement of the monitoring image 11 carried out after a period of operation of the system.

As a variant, the system is in operation when the second measurement is performed. According to another variant, the system is temporarily interrupted when the second measurement is carried out.

A first example of a type of defect detectable by the device according to the invention is a wave surface defect such as a defocussing. From a measurement of the variation in the dimension of the monitoring image, the existence of a defect causing the deterioration of the quality of the wave surface is deduced. By way of example, a defocussing defect may be detected from the first and second measurements.

A second example of a type of defect detectable by the device according to the invention is a misalignment of the boresight, which induces a displacement of the position of the monitoring image 11 in the focal plane Pf. From a measurement of the displacement of the monitoring image 11, the existence of an alignment defect is deduced. By way of example, a misalignment may be detected based on a first measurement corresponding to the aligned imaging system 101 and a second measurement corresponding to the imaging system exhibiting a misalignment of the boresight. A measurement of displacement of the position of the monitoring image is compatible with the use of a full-circle detector as the detection element C.

According to another aspect of the invention, an optical imaging system 101 is also provided that comprises an optical monitoring device such as previously described.

Figure 10:
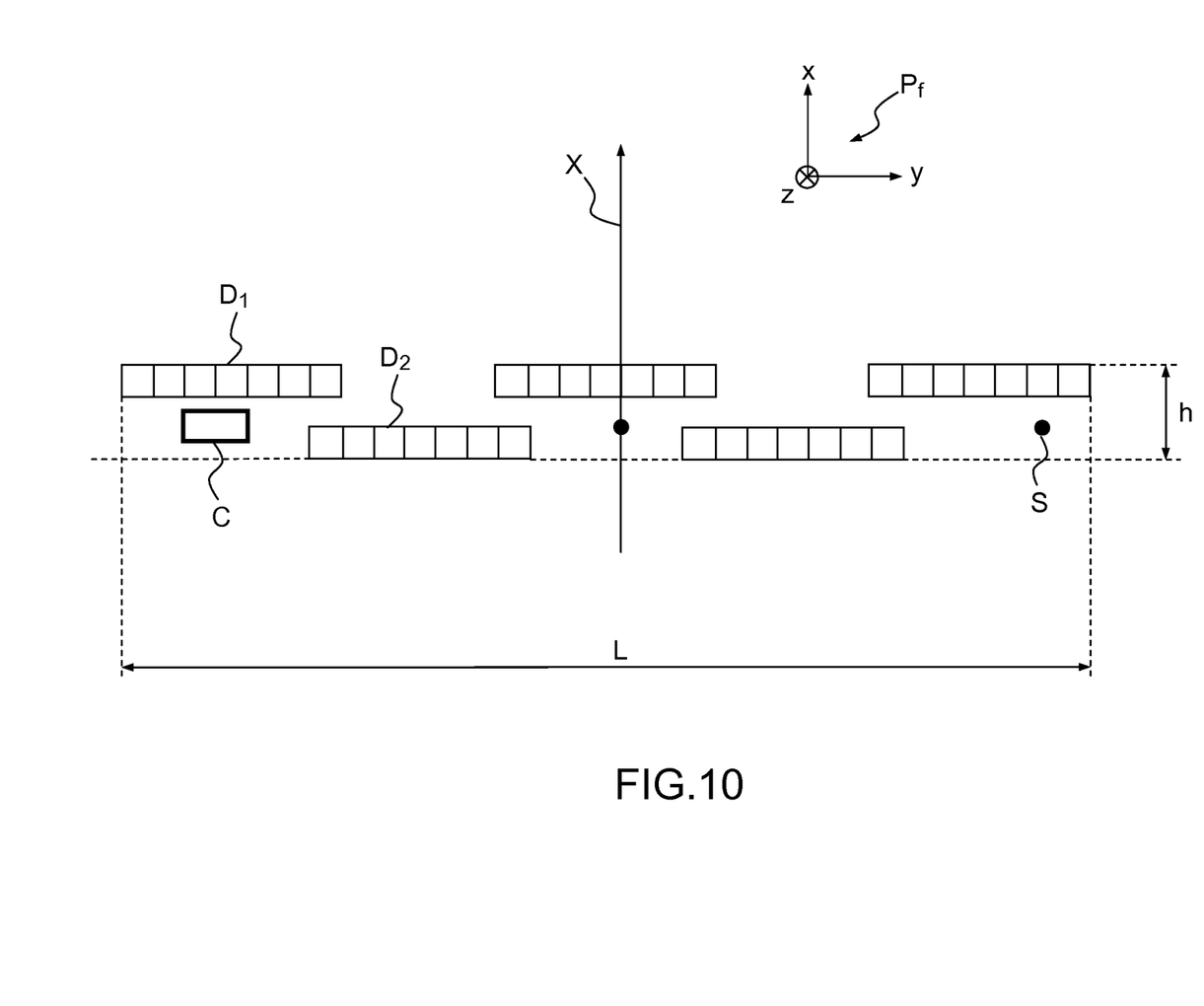
FIG. 10 illustrates one example of arrangement of the focal plane of an imaging system comprising a plurality of linear arrays and comprising a device according to the invention.

The optical imaging system 101 is for example a high-resolution telescope for observation of the Earth (ground resolution of 20 to 50 cm) carried onboard a satellite. One example of arrangement of the focal plane Pf of such a system 101 comprising a device according to the invention is shown in FIG. 10. The image detector D is composed of a plurality of linear or matrix sensors D1, D2, etc. For example, a retina composed of 5 linear sensors with 6000 points of 13 µm pitch has a length L of around 500 mm for a height h of around 50 mm.

The scan direction of the scene takes place along the x-axis. The source S and the detection element C of the device 1 according to the invention are disposed on either side of the optical axis z in the focal plane Pf as shown in FIG. 10.

Figure 11:
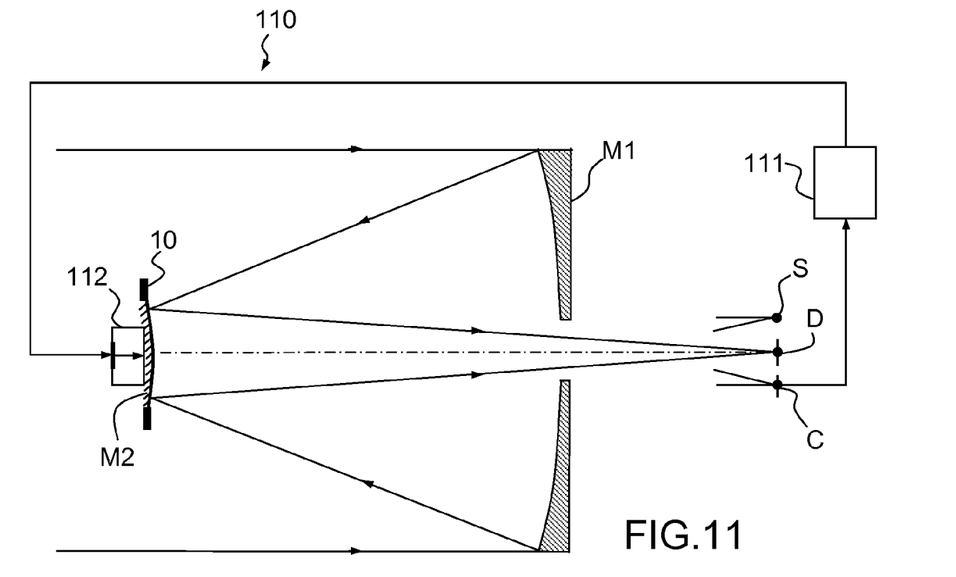
FIG. 11 shows an active imaging system comprising control means and an actuator designed to control a displacement of the second mirror of the imaging system.

Advantageously, the imaging system 110 shown in FIG. 11 is active and furthermore comprises control means 111 designed to control an actuator 112 capable of effecting a modification of the optical imaging system 110 in such a manner as to correct, at least partially, the defect identified by the analysis of one or more monitoring images.

By way of example, FIG. 11 shows an active imaging system 110 comprising a first mirror M1 and a second mirror M2 such as previously described. The type of defect measured comprises a defocussing and the actuator 112 is designed to command a displacement of an optical element, for example the second mirror M2, in such a manner as to correct the defocussing.

The process can be applied in an iterative manner according to a loop, by carrying out, for each displacement of the actuator, a measurement of the monitoring image 11 until the monitoring image reaches a predetermined dimension or else a dimension similar to the calibration image previously recorded.

Figure 12:
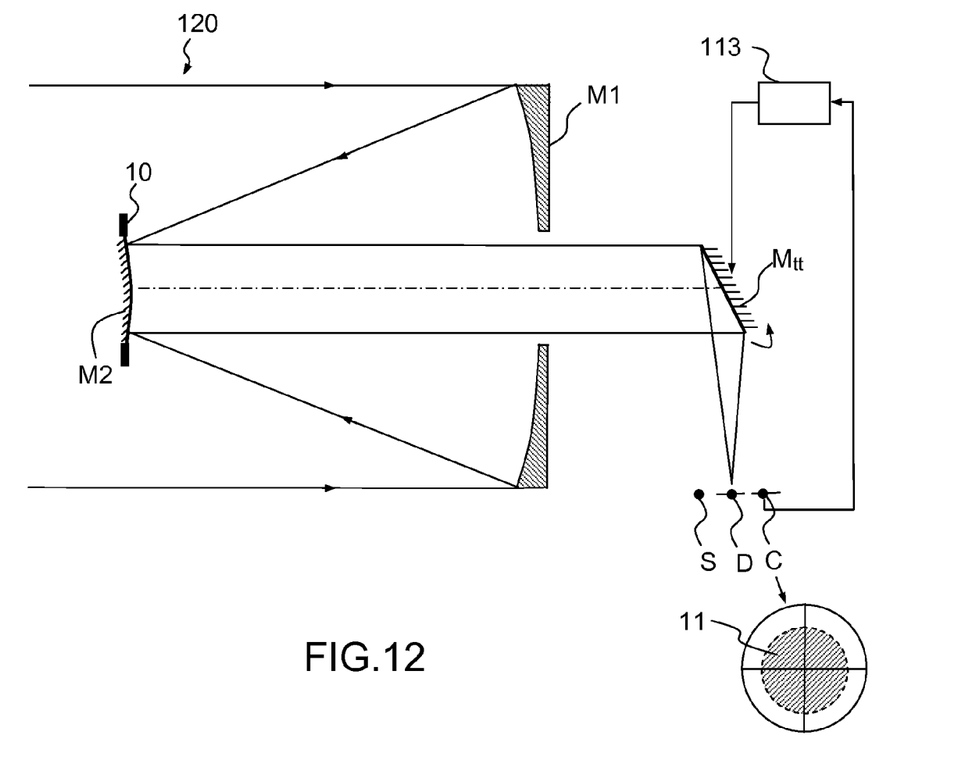
FIG. 12 shows an active imaging system comprising control means and a mirror mobile in rotation designed to angularly modify the boresight of the imaging system.

Advantageously, the imaging system 120 shown in FIG. 12 is active and the defect detected by the device according to the invention comprises a misalignment of the boresight, for example using a detection element C such as a full-circle detector. The variation of the boresight results in a decentring of the monitoring image received by the detector C. The means of analysis coupled with the detection element identify the amplitude and the direction of the displacement. The imaging system 120 further comprises control means 113 designed to control an actuator of the mirror $M_{tt}$ type mobile in rotation (or Tip-Tilt mirror according to the terminology in use), in such a manner as to angularly modify the boresight so as to correct the misalignment. The mobile mirror $M_{tt}$ is preferably disposed on the exit pupil of the imaging system.

The process can be applied in an iterative manner according to a loop, by carrying out, for each displacement of the mirror $M_{tt}$, a measurement of the centring of the monitoring image 11 until the monitoring image is centred. The bandwidth of the closed-loop control should be adapted to the frequency of the interference effect that it is desired to correct.

As a variant, the two types of loops are implemented in the active optical imaging system and the defect comprises a defocussing and a misalignment of the boresight. According to one embodiment, the source S and the sensor C are common to the two loops.

According to another embodiment, the system comprises two specialized sensors C, one for the monitoring of the wave surface and the other for the monitoring of the boresight.

The invention claimed is:

1. An optical monitoring device for an optical imaging system having a focal plane, an optical axis and an entry pupil, said system forming an image of a scene substantially at infinity on at least one image detector disposed substantially in said focal plane, the device comprising:
   at least one substantially a point emission source disposed on the periphery of the detector and substantially in the focal plane, and
   a reflecting element with a plane surface,
   the element being disposed upstream of the imaging system when considering the direction of propagation of the light rays coming from the scene, and according to a position and an inclination such that a monitoring image of the source produced by the optical system and reflected by the element is disposed substantially in the focal plane on a detection element connected to means for analyzing the monitoring image allowing potential optical defects to be identified,
   the element having an annular shape so as to allow the passage of light rays coming from the scene and passing through the entry pupil.

2. The optical monitoring device according to claim 1, in which the detection element comprises a sensor disposed on the periphery of the image detector.

3. The optical monitoring device according to claim 1, in which the detection element comprises one of the image detectors.

4. The device according to claim 1, in which the optical system comprises a telescope comprising at least a first aspherical collector mirror and a second mirror.

5. The device according to claim 1, in which the optical system comprises a telescope of the "TMA" type.

6. The device according to claim 4, in which the element is disposed around the second mirror.

7. The device according to claim 4, in which the element is disposed at a distance close to the first mirror so as to minimize the effect of the decrease in useful diameter of the said entry pupil.

8. The device according to claim 1, in which the source comprises a first optical fibre disposed in a first plane perpendicular to the optical axis and a second optical fibre disposed in a second plane parallel to the first plane and offset with respect to this first plane, the first and second plane being disposed in the neighborhood of the focal plane, the two defocussed monitoring images allowing a sign of the optical aberration of the imaging system to be determined.

9. The device according to claim 1, in which the said sensor is a phase-diversity sensor.

10. The device according to claim 1, in which the sensor performs a first measurement for calibration of the monitoring image when the imaging system exhibits a given optical quality and at least a second measurement of the monitoring image carried out after a period of operation of the imaging system, the analysis means being designed to identify an optical defect by comparison between the first and second measurement of the monitoring image.

11. The device according to claim 1, in which the device is designed to identify a defocussing of the said imaging system.

12. The device according to claim 1, in which the device is designed to identify a misalignment of a boresight of the said imaging system.

13. An active optical imaging system comprising an optical monitoring device according to claim 1.

14. An active optical imaging system according to claim 13, further comprising control means to control an actuator capable of effecting a modification of the optical imaging system in such a manner as to correct at least partially the defect.

15. The active optical system according to claim 14, in which the defect comprises a defocussing and the actuator is designed to control a displacement of an optical element in such a manner as to correct the defocussing.

16. The active optical system according to claim 14, in which the defect comprises a misalignment of a boresight, and further comprising control means designed to control an actuator of the mirror type mobile in rotation in such a manner as to angularly modify the boresight in order to correct the misalignment.

\* \* \* \* \*